United States Patent
Walter et al.

(10) Patent No.: US 6,748,985 B2
(45) Date of Patent: Jun. 15, 2004

(54) INLET DEVICE AND ITS USE

(75) Inventors: Joachim Walter, Biberach an der Riss (DE); Uwe Striffler, Biberach an der Riss (DE); Jan Feuser, Biberach an der Riss (DE)

(73) Assignee: Amersham Biosciences AB, Uppsala (SE)

( * ) Notice: Subject to any disclaimer, the term of this patent is extended or adjusted under 35 U.S.C. 154(b) by 0 days.

(21) Appl. No.: 10/275,372

(22) PCT Filed: May 17, 2001

(86) PCT No.: PCT/EP01/05657
§ 371 (c)(1),
(2), (4) Date: May 6, 2003

(87) PCT Pub. No.: WO01/87450
PCT Pub. Date: Nov. 22, 2001

(65) Prior Publication Data
US 2003/0172989 A1 Sep. 18, 2003

(30) Foreign Application Priority Data
May 17, 2000 (SE) .......................................... 0001859-8

(51) Int. Cl.⁷ .............................................. B01D 15/08
(52) U.S. Cl. ......................... 141/301; 141/70; 141/286
(58) Field of Search ............................ 141/67, 70, 113, 141/285, 286, 301, 302; 210/198.2, 281, 656, 659

(56) References Cited

U.S. PATENT DOCUMENTS

| | | | |
|---|---|---|---|
| 3,888,423 A | * 6/1975 | Ganiaris | ..................... 239/567 |
| 5,298,226 A | * 3/1994 | Nowobilski | .................. 422/171 |
| 5,902,485 A | * 5/1999 | Davis et al. | ................. 210/656 |
| 6,610,200 B1 | * 8/2003 | Leijon et al. | ............ 210/198.2 |

FOREIGN PATENT DOCUMENTS

| | | |
|---|---|---|
| EP | 0 596 255 | 5/1994 |
| WO | WO 96/26436 | 8/1996 |
| WO | WO 00/25883 | 5/2000 |

* cited by examiner

Primary Examiner—Gregory Huson
Assistant Examiner—Peter deVore
(74) Attorney, Agent, or Firm—Royal N. Ronning, Jr.; Stephen G. Ryan; Yonggang Ji

(57) ABSTRACT

An inlet device for a reactor vessel (5) intended for a separation method comprising retaining a substance on a separation medium from a liquid passing through the reactor vessel (5) which contains the separation medium. The device comprises (a) a distributor block (7) enabling a liquid flow to pass through the block into the reactor vessel (5), (b) an inlet block (3), (c) a distribution chamber (1) defined by a space between the distributor block (7) and the outlet side (11) of the inlet block (3), (d) at least one conduit (I; 13a, 13b . . . ) passing through the inlet block (3) from the inlet side (10) to the outlet side (11) of said inlet block (3) and ending in the distribution chamber (1), said at least one conduit being able to distribute liquid into the distribution chamber (1), (e) a gross liquid flow direction going perpendicular to the plane of the interface between the distribution block (7) and the distribution chamber (1). One characteristic feature is that one or more of said at least one conduits (13a,13b . . . ) in the chamber (1) are capable of moving selectively the liquid next to the inlet side surface (11) of the distribution chamber (1) along and/or against said surface (11).

11 Claims, 4 Drawing Sheets

Fig. 2a
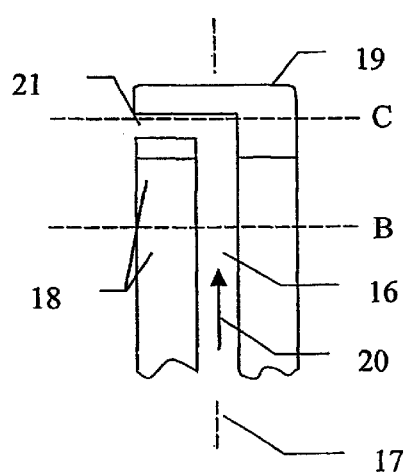
Fig. 2b
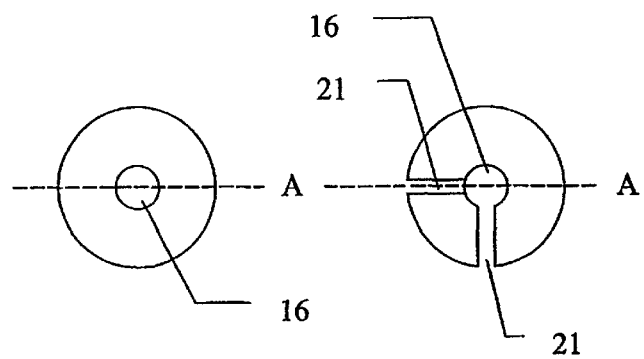
Fig. 2c
Fig. 2d
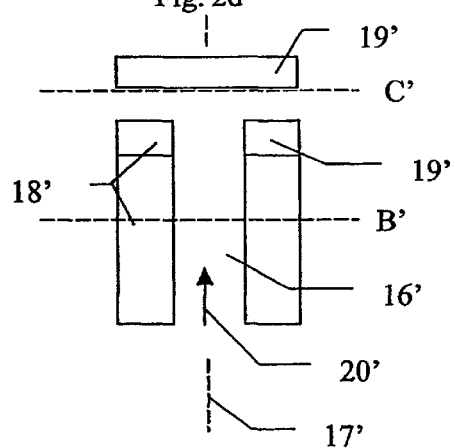
Fig. 2e
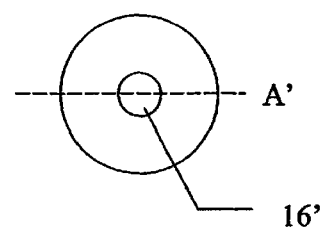
Fig. 2f
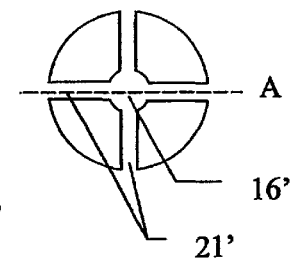

INLET DEVICE AND ITS USE

TECHNICAL FIELD AND BACK-GROUND PUBLICATIONS

The present invention relates to a device to be used at the inlet end of a reactor vessel in which one or more substances are retained on a separation medium from a liquid passing through the vessel. This kind of separation can be carried out in batch-wise mode or in chromatography mode. The separation medium is typically in form of porous or non-porous particles that may be present as a packed or fluidised bed, the latter encompassing fully disordered fluidised beds (batch-wise mode) or classified or stabilised fluidised beds (chromatography fluidised mode).

The "term retained on a separation medium" means that the substance(s) are capable of interacting with the separation medium, such as in separations based on (a) affinity adsorption including ion exchange and other kinds of non-covalent bindings, (b) covalent binding and/or (c) on size exclusion.

Various devices to be used at the inlet side of this kind of reactors have been described in the background art. See for instance WO 9218237 (Amersham Pharmacia Biotech AB) and WO 0025883 (application no PCT/SE99/01957, Amersham Pharmacia Biotech AB), both of which are incorporated by reference.

Typically inlet devices have comprised (a) distributor means which comprises a block or a plate and permits a liquid flow to pass through into the interior of the reactor vessel,
(b) an inlet block or plate having one or more through-going conduits permitting liquid to pass through the inlet block or plate,
(c) a distribution chamber defined by a space between the distributor means and the inlet block or plate, and
(d) a gross flow direction passing from the distributor chamber to and through the reactor vessel.

A recess in the inlet block typically defines the distribution chamber. The distribution block covers the recess. If the recess is tapered there may be no distinct walls of the chamber. If chamber has walls they are in the context of the invention included in the outlet side of the inlet block or plate, if not otherwise specified.

There has been a recent suggestion in the field to equip the outlet of the inlet conduits in the inlet block with "sprinkler means" (nozzles) (WO 0025883, FIG. 4, pages 16–17). The main purpose of the design has been to facilitate an even distribution of liquid to the distributor block. There is a suggestion that this design possibly will assist in keeping the chamber clean from sticky components.

Figure 1:
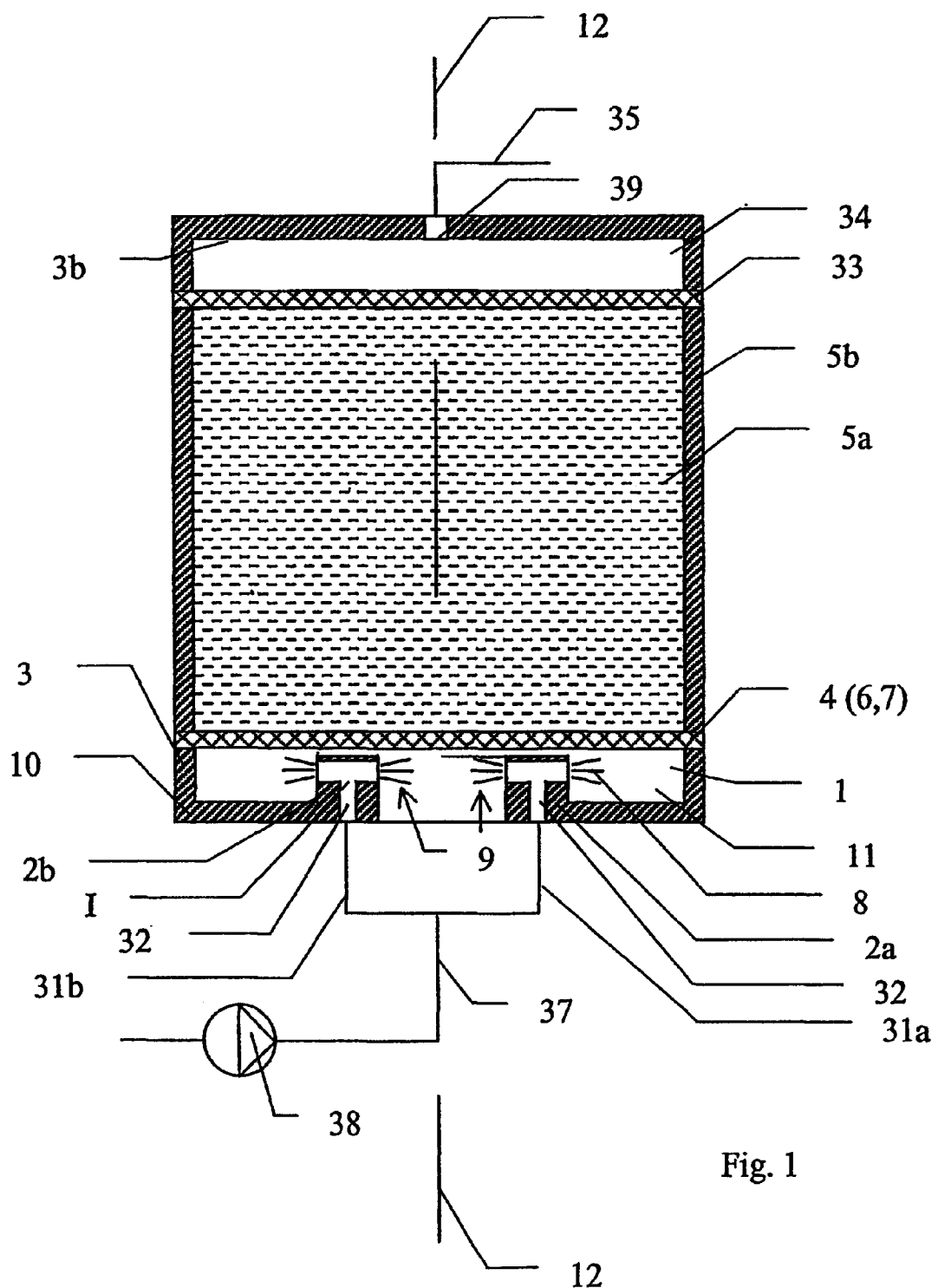

The design with sprinkler means is illustrated in FIG. 1 of the present specification. There is a distribution chamber (1) having one or more conduits (2a,2b . . . ) projecting and permitting liquid flow through an inlet block (3) into the chamber (1). The chamber (1) is via distribution means (4) in liquid communication with the interior (5a) of a reactor vessel (5b) in which a separation medium is present. The distributor means may comprise a net/mesh (6) and/or a block (distributor block, 7) having open through passing channels permitting liquid flow between the chamber (1) and the interior of the reactor vessel (5). On the chamber end of each incoming conduit (2a,2b . . . ) there are sprinkler means (nozzles) (8) in form of a cap and openings (9) placed circularly in the wall of the end of the conduit just before the cap. The conduits (2a,2b . . . ) extend from the inlet block (3) from the inlet side (10) to the outlet side (11) (=inlet side/surface of the distribution chamber). The incoming liquid is in the variant shown distributed radially in a plane perpendicular to the flow direction in the conduit concerned, i.e. perpendicular to the central axis (12) of the chamber.

To each of the conduits (2a,2b . . . ) there are connected a tubing (31a,31b) that comes from a common tubing (37) equipped with a pump (38). Between the outlet end (11) and the nozzle (8) the conduit has a central tubular part in form of a central channel (32). At the outlet end of the reactor vessel (5) there is an outlet tubing (35) and an outlet adapter comprising a collector block (33), a collector chamber (34), an end block (36) with an outlet opening (39).

The inlet devices discussed above may be present as a bottom adapter or as a top adapter if the flow through the reactor vessel is upward or downward, respectively. If the flow direction is upward the outlet side (11) becomes the bottom/bottom surface of the distribution chamber.

The outlet side (11) is typically also the inlet side of the distribution chamber (1).

For reasons of simplicity the term "block" in the instant specification contemplates true block dimensions and plate dimensions, if not otherwise specified.

In WO 91 00799 (Upfront Chromatography) there is described certain inlet devices that create a turbulent zone at the inlet end of the reactor vessel and a non-turbulent zone remote from the inlet end. The length of the turbulent zone is dependent on the flow velocity. The turbulent zone is created by the presence of agitating means (for instance a stirrer) in the inlet end of the reactor vessel. In many of the variants described in this publication the use of a distributor block becomes redundant. Liquids may enter through a side-wall of the reactor vessel/distributor.

Problems Associated with Back-ground Techniques

The liquid containing the substance to be adsorbed often contains particulate matters that have a tendency to sediment due to inappropriate flow conditions in various parts of a separation system, such as in inlet devices. Once sedimented, particulate material may start adhering to surfaces due to an inherent stickiness. This is particularly true for biologically derived liquids containing for instance cells, cell debris and/or other sticky particulates and/or sticky solutes. This problem has been found to be most severe for liquids deriving from cell culture broths and/or containing mammalian cells and/or mammalian cell debris. In inlet devices, for instance according to WO 0025883, it has turned out that particles of the separation media may assemble in the distribution chamber even if there is a check valve in the distributor block. Consequently the inlet devices described above are in need to be improved. The present invention has as its major objective to provide solutions to this kind of problems.

OBJECTIVES OF THE INVENTION

Accordingly a first objective of the invention is to provide an improved inlet device that at least partially circumvent the problems just discussed.

A second alternative is to provide an improved method in which these problems are reduced.

A third objective is a method for reducing the same problems.

DRAWINGS

FIG. 1 represents a cross-sectional view of the closest prior art as it is described in WO 0025883 (FIG. 4, pages 16–17).

FIGS. 2a–f are cross-sectional views of conduits Ia and Ib with two kinds of nozzle functions(FIGS. 2a–c and FIGS. 2d–f, respectively). The views are along the planes indicated (A, B and C).

Figure 3:
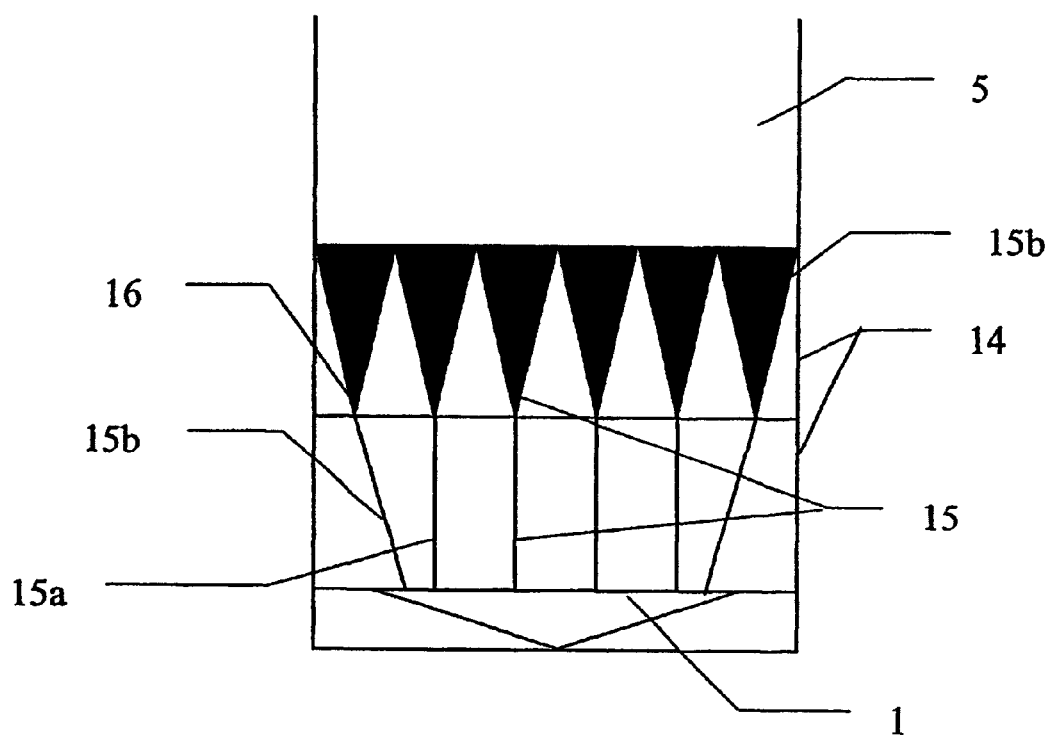

FIG. 3 shows schematically a central vertical cross-sectional view of a distributor block, which has been used with the conduit arrangements shown in FIGS. 2a–f. See further WO 0025883.

FIGS. 4a–e illustrate variants of arrangements of conduits in the distribution chamber with the directions of the openings in the conduits indicated. The view is from above and perpendicular to the central axis of the inlet surface of the distribution chamber. The outlet surface (11) of the inlet block (3) is circular. The various arrangements have been challenged with liquids containing biomasses.

The same numerals have been used for parts that have the same function.

The Invention

The first aspect of the invention an inlet device for a reactor vessel intended for the kind of separations defined in the introductory part. Our new devices are based on the previously known variant defined in FIG. 1 and comprises:

(a) a distributor block (7) enabling a liquid flow to pass through the block into the reactor vessel (5),
(b) an inlet block (3),
(c) a distribution chamber (1) defined by a space between the distributor block (7) and the outlet side (11) of the inlet block (3),
(b) at least one conduit (I; 13a,13b . . . ) passing through the inlet block (3) from the inlet side to the outlet side (11) of the inlet block (3) and ending into the distribution chamber (1), said at least one conduit being able to direct liquid flow into the distribution chamber (1),
(e) a gross liquid flow direction going perpendicular to the plane of the interface between the distribution block (7) and the distribution chamber (1), i.e. in principle the same flow direction as in the reactor vessel (5).

The present inventors have recognized that the problems discussed above can be at least partially overcome for this kind of devices by increasing selectively the liquid movement next to and along the inlet side surface (11) of the distribution chamber (1). In other words the liquid from one or more up to all of the conduits I should be directed against and/or parallel with the inlet side surface (11) of the distribution chamber (1). This can be accomplished by arranging the incoming liquid from said at least one conduit to give a liquid movement at the inlet side surface (11) of the distribution chamber (1), which movement comprises (a) one first component (component 1) that has a circular direction in a plane perpendicular to and around the central axis (12) of the inlet surface (11) of the distribution chamber (1),
(b) one second component (component 2) that has a direction that is perpendicular to said plane and against the gross flow direction.

Component 1 is thus tangential relative to the centre of surface (11). In this context the inlet surface (11) of the distribution chamber (1) should be circular or in form of an essentially regular polygon, preferably having corner angles >90° such as >100°. See below.

A preferred feature of this aspect is that

A. one or more conduits (Ia; 13'a,13'b . . . ) of said at least one conduit (I;13a,13b . . . ) are capable of directing liquid radially in one or more distinct directions, all of which distinct directions are
  (i) within an interval of 0°–180°, such as 0°–145° or 0°–90°, around the central axis of the conduit, i.e. the angle between two distinct directions is >0° and <180°, and for the smaller intervals >0° and <145° or >0° and <90°, and/or
  (ii) in an interval of 90°–180° relative to the liquid flow along the central axis of the conduit, i.e. ally or partially opposite the liquid flow along the central axis, and
B. said one or more conduits (Ia; 13'a,13'b . . . ) are mounted in the outlet side (11) of the inlet block (3) in a manner enabling a circular liquid movement around the central axis (12) and along the inlet side (11) of the distribution chamber (1), and/or a liquid movement directed towards the same side (11).

See FIGS. 2a–c and 4a–e.

The term "distinct direction" means that the flow is coming from one or more openings pointing in the same direction of one and the same conduit. Se for instance FIGS. 2a–f. The number of conduits Ia (13'a,13'b . . . ) in a distribution chamber (1) is preferably 2, 3, 4, 5, 6 and up to 25. The number of distinct flow directions for each conduit Ia may be 1, 2, 3, 4, 5, 6 and up to 10 or even more.

In addition to the conduits (Ia; 13'a,13'b . . . ), the conduits I may also comprise one or more conduits (Ib; 13"a, 13"b . . . ), each of which direct liquid flow in at least two essentially opposite directions from the central axis of the conduit, ire. at least two flow directions at an angle ≧180° relative to each other, for instance 180°±45°, such as 180°±10°. In preferred variants, this kind of conduits may have 2, 3, 4, 5, 6 and up to 20 distinct directions which may be regularly and/or essentially evenly distributed around the central axis of the conduit. The liquid flow from this kind of conduits may also be directed according to (ii) above, e.g. fully or partially against the flow passing along the length axis of the conduit. The number of conduit Ib in the distribution chamber (1) may be 1, 2, 3, 4, 5, 6 and up 10 or even more.

See FIGS. 2d–f and 4a–e.

One or more up to all of the conduits Ia and Ib may be slidably mounted in the inlet block (3). By this is meant that the conduits are rotatable along their length axis and/or adjustable in a length-wise manner, i.e. into or out of the distribution chamber (1) through the inlet side (11) of distribution chamber (1). There are also other alternatives for arranging for the conduits to be movable within the distribution chamber (1).

One or more up to all of the conduits Ia and Ib may be fixedly mounted in the inlet block (3).

If there are movable conduits, it may be arranged so that one or more up to all of them are controlled from an outside position as to height above the bottom surface (11), degrees of rotation and opening and closing. This control may be performed manually or automatically according to preset values depending on the incoming liquid fluid as discussed below. Manual operation is simplest to forecast because the conduits may be slidably mounted in the holes in the inlet block (3). Closing/opening may be performed by attaching and removing clamps or by ways of valves on tubings leading to each conduit (not shown).

The conduits may be of the same or different outer diameter. By using conduits of the same outer diameter conduits of different functional kinds thus become easily interchangeable.

A certain kind of conduit is a so-called "dummy conduit" which is non-functional with respect to letting flow through.

Dummy conduits may replace functional conduits if they are of the same outer diameter.

In the most preferred and simple variants of the invention at the priority date, the reactor vessel is placed vertically with the inlet device at the lower part of the vessel, i.e. the gross liquid flow direction through the inlet device (3) and the reaction vessel (5) is upward. This is in analogy with FIG. 1.

Geometric Configuration and other Features of the Various Parts of the Inlet Device Cross-sectional surfaces/areas discussed in this text are always perpendicular to the gross liquid flow direction.

The Interface (a) between the inlet block (3) and the distribution chamber (1) (area I),
(b) between the distribution chamber (1) and the distribution block (7) (area II) and
(c) between the distributor block (7) and the reactor vessel (5) may be of different geometric forms as described in WO 0025883, for instance. For interface (a) (inlet side (11) of the distribution chamber (1)), the preference is for a regular pentagon, hexagon etc, the general rule being that corner angle should be as close as possible to 180°. In other words rounded forms (such as circular) are preferred because they will give a minimum in dead-volumes where particulate materials can assemble. The sizes of the areas may be the same or different, with preference for area I≦area II≦area III. Area I and area II may be connected by distinguishable walls of the distribution chamber (1) that are more or less parallel to the gross flow direction. This is analogy with FIG. 1. The chamber (1) may also be tapered or rounded along the direction of the central axis (12) making walls more or less indistinguishable.

The distributor block (7) may be as described in the background art (FIG. 1), i.e. a perforated plate (7), possibly combined with a net (6) or possibly a net (6) alone. In an alternative (FIG. 3) it may be a true block (14) in which there are channels (15), possibly containing a check valve (16) for rendering it difficult for particles of separation media to enter the distribution chamber (1). The chancels (15) may have one part (15a) next to the distribution chamber that is narrow and another part (15b) that is widening into the reactor vessel. See WO 0025883. If the cross-sectional area of the distribution chamber (1) is less than the cross-sectional area of the reactor vessel (5), the narrow parts (15'a) of the peripheral channels (15') preferably are leaning outwards in the gross flow direction. In this case due care should be taken to arrange for the pressure drop across each channel (15) to be essentially the same.

The inlet block (3) and distribution block (7) may be manufactured in materials, such as plastics (for instance acrylics) and stainless steel. Transparent material is particularly useful at the development stage of a process, because it will facilitate optimization of flow velocities and flow directions from the conduits in a distribution chamber. Once the flow within the inlet device is optimised, it is often appropriate to transfer the results to an inlet device made of stainless steel or any other material that is fitted to large scale repetitive processes. The manufacture of the inlet block encompasses making holes, for instance by drilling, for the conduits I.

The various parts of the inventive inlet device, including the reactor vessel, are hold together by techniques well-known in the field.

The Geometry of the Conduits

Each conduit has a tubular part (18,18') and a nozzle part (19,19'). See for instance FIGS. 2a–f). In principle the nozzle part corresponds to the part defining the discrete flow directions discussed above, i.e. the outlet part of the conduit. The central axis of a conduit is the same as the central axis of the tubular part and is typically parallel with the flow direction within the conduit (=flow direction within the tubular part).

FIGS. 2a–c illustrate a variant of conduit Ia. In the side view (FIG. 2a) and in a cross-sectional view (FIG. 2b) there is seen a central channel (16) for liquid flow along the length axis (17) of the tubular part (18) of the conduit ending with a nozzle part (19) including a closure cap. The arrow (20) shows the intended flow direction within the conduit (=within the tubular part). Below, but adjacent to, the closure cap (19) (FIGS. 2b and c), there are at least one radially directed opening (21) for radial exit of liquid from the nozzle part (19). The angle between the direction of the openings (21) and the central axis (17) is in the interval of 90°–180°, with one or more up to all of the openings (21) having the same direction in this respect. The preference is for 90°. The radial directions of the openings (21) are within an interval of 0°–180°, such as 0°–145° or 0°–90° around the central axis (17) of the conduit (tubular part (18). The total number of openings per conduit is as said above for the number of distinct flow directions.

FIGS. 2d–f illustrate another kind of conduit. In FIGS. 2d–e there is seen a central channel (16') for liquid flow along the length axis (17') of the tubular part (18') of the conduit ending with a nozzle part (19) including a closure cap. The arrow (20') shows the intended flow direction within the conduit (=within the tubular part). Below, but adjacent to, the closure cap (19') (FIGS. 2b and c), there are at least one radially directed opening (21') for radial exit of liquid. Below, but adjacent to, the closure cap (19) (FIGS. 2b and c), there are at least one radially directed opening (21) for radial exit of liquid from the nozzle part (19). The angle between the direction of an opening (21) and the central axis (17) is in the interval of 90°–180°, with one or more up to all of the openings (21) having the same direction in this respect. The preference is for 90°. The radial directions (21') cover a range which is >180° with the upper limit being 360°, such as 270°–360° and 315°–360°, around the central axis (17') of the conduit (tubular part, 18'). There are thus one or more openings for which there is another opening directed in essentially the opposite direction. By "essentially opposite direction" is meant 180°±90°, such as 180°±45° or 180°±10°, relative each other. The total number of openings per conduit is as said above for the flow directions.

The cross-sectional areas of openings (21,21') and the central channel (16) will depend on the other dimensions of the inlet device, number of conduit, the linear flow velocity in the gross flow direction etc. An opening (21,21') may, for instance, has a size corresponding to a circular hole of 0.5–5 mm in diameter when the inner diameter of the central channel (16) is within the range of 2–10 mm, with preference for 4–8, mm in diameter. This is said without delineating against inventive variants that do not utilize this specific combination of measures.

In addition to conduits Ia and Ib there may also be conduits giving rise to a flow in other directions, for instance in the same direction as the flow direction within the tubular part of a conduit, possibly at an angle up to, but less than 90°.

When positioned in the inlet block (3) the conduits I, for instance Ia and Ib, are projecting from the inlet side (11) into the distribution chamber (1). Preferably the central length axis of a conduit is in the same direction as the gross flow direction although this does not exclude also other directions even if this might lead to arrangements of the openings in the conduits other than those represented by FIGS. 4a–f. This may be illustrated by placing conduits I also in a true wall or tapered parts (if present) of the distribution chamber (1) in which case the openings in the nozzle part may have other directions than discussed previously. Examples are openings pointing more or less along the central axis (17) at an angel <90° against the flow direction in the conduit. These latter variants, when placed in a side-wall, may be used to create a tangential or circular flow. The openings (21, 21') are adjacent to the inlet surface (11), for instance directly at the surface (0 mm) or at a distance within 0–25, preferably 0–10 mm.

The appropriate linear flow velocity in the openings (21,21 ') may vary widely and depends on the incoming gross liquid flow velocity, number of conduits, number of holes in each conduits, the pressure drop over each hole, the viscosity of the incoming liquid, the stickiness and the sizes of particulate matters in the liquid etc. In principle it is selected in the interval of 5–1000 cm/sec, preferentially within 10–300 cm/sec.

The conduits Ia and Ib may be present in various combinations and various more or less regular patterns. For each type of conduits, it is preferred to place them annularly in one or more concentric circles, for instance with an n-numbered axis of symmetry (coinciding with the central axis (12)). n is an integer larger than 0, for instance 1, 2, 3, 4 etc. Suitable axis of symmetry is determined by the number and/or type of conduits etc. In case there are different kinds of conduits they may be arranged with different type of symmetry pattern. Type Ia conduits are typically placed annularly in an outer part of the inlet surface (11) of the distribution chamber (1) while type Ib conduits are placed more central. In case there is only one conduit Ib, it is preferably placed in the centre of the surface (11) as illustrated in FIGS. 4a–e.

FIGS. 4a–e represent designs which have been tested in combination with the distributor block illustrated in FIG. 3. The distribution chamber was loaded with separation media leaked through the distributor and/or was challenged with biomass in the feed-stream. The distribution block was attached to a squaric reactor vessel described in WO 0025883.

Figure 4A:
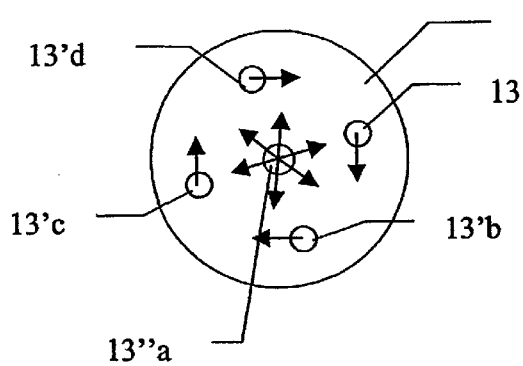

FIG. 4a illustrates a distribution chamber (1) with four conduits Ia (13'a,13'b,13'c,13'd; one flow direction each) which are placed in an annular pattern around a central conduit Ib (13"a, six flow directions) on the inlet surface (11) of the distribution chamber (1). The inlet surface (11) is circular. This design was challenged with biomass for 2 hours at a linear flow velocity of 180 cm/hr. No biomass sedimentation could be detected.

Figure 4B:
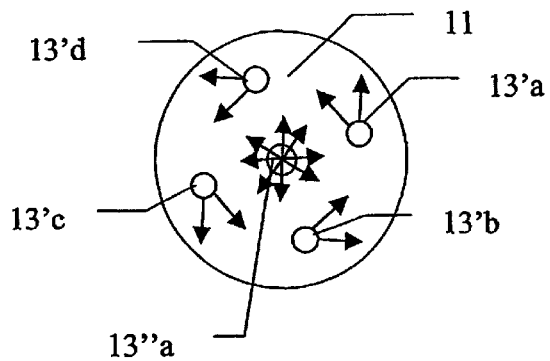

FIG. 4b illustrates a distribution chamber with four type Ia conduits (13'a,13'b,13'c,13'd, two flow directions per conduit) placed annularly with one type Ib conduit in the centre (13"a, eight flow directions). This design was challenged for 5 minutes under the same flow conditions as in FIG. 4a. Insufficient clearance of separation media from the distribution chamber. No accumulation of biomass during extended operation.

Figure 4C:
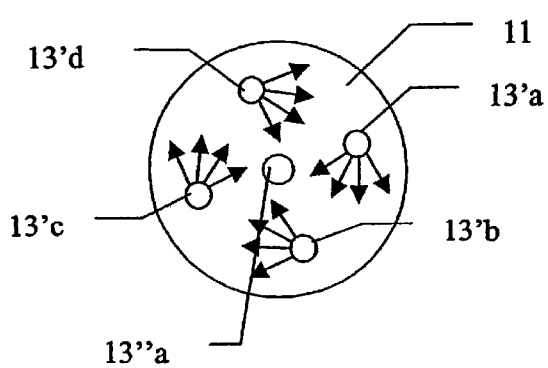

FIG. 4c illustrates a distribution chamber with four type Ia conduits (13'a, 13'b, 13'c,13'd, four flow directions per conduit) placed annularly with one closed type Ib conduit in the center (13"a). The distribution chamber was loaded with separation media as discussed above and subjected to linear flow velocities of 200 cm/h and 290 cm/h in the reactor vessel. The results suggested that a higher flow velocity was beneficial for removing the separation media and for preventing accumulation of biomass in the distribution chamber.

Figure 4D:
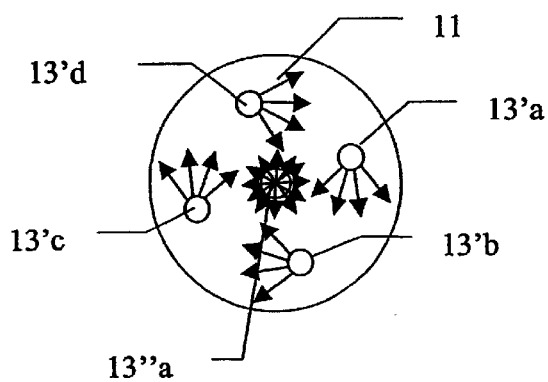

FIG. 4d illustrates a distribution chamber with four type Ia conduits (13'a,13'b,13'c,3'd, four flow directions per conduit) placed annularly with one type Ib conduit in the centre (13"a, twelve flow directions). This design gave total separation media clearance after 40 minutes at a linear flow velocity of 200 cm/h. Biomass accumulation was avoided.

Figure 4E:
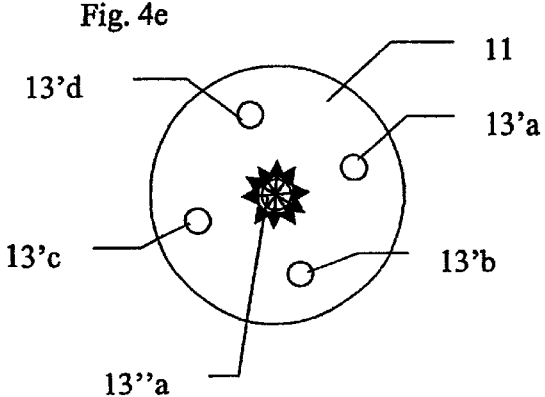

FIG. 4e illustrates the same configuration as in FIG. 4d but with the conduits Ia (14'a,14'b,14'c,14'd) closed. No total clearance of separation media from the distribution chamber took place at 200 cm/h. Biomass accumulation was avoided.

The inlet device of the invention can be used at linear flow velocities (in the gross flow) from 25–50 cm/h and up to about 3000 cm/h, for instance. For particular situation the appropriate range is determined by separation media and separation mode, sizes and number of conduits and holes therein etc. Based on the present results that the most important advantages are found within 25–1000 cm/h and in particular below 700 cm/h.

The separation methods discussed in the introductory part typically comprise a retaining step (typically an adsorption) and a subsequent release step (desorption or elution step). Between these two steps there may be a washing step. Subsequent to the release step there may be a regeneration step that more or less may coincide with an equilibration step in case a process is made cyclic by restarting with an retaining step. Between the release step and a regeneration step there may be inserted a cleaning step during which high salt or strongly alkaline solutions are used. The above-mentioned main steps may consist of part steps, which differ with respect to the buffer used. For instance a release step may make use of one starting releasing buffer eluting one component and then a subsequent different releasing buffer releasing other components.

The largest advantages with the invention are probably in the retaining step and in the cleaning step. The reason for the advantages in the retaining step is that the inventive design will counteract sedimentation of particulate material of the feed stream in the distribution chamber and thereby also lower the risk for sticky components too adhere. With respect to the cleaning step the inventive design will assist in removing sedimented and adhered substances from the distribution chamber.

Particularly great advantages is at hand in case the inventive device is used in a process in which the separation media is in form of a fluidised bed, for instance with a plug flow through the bed. This means that the plate number should be at least 5, with preference for at least 35, in this variant of the invention The liquid containing the substance to be retained may derive from a biological fluid. The liquid may, for instance, originate from a cell culture and/or contain cell and cell debris, for instance of mammalian origin, and/or other sticky particulates and/or sticky solutes. However this does not exclude that there also are advantages with liquids containing non-sticky or less sticky components, for instance intact yeast, fungi and bacterial cells, or the more sticky mixtures obtained by breaking up these kinds of cells such as lysates, homogenates, pastes etc. The most important substances to be adsorbed in the context of the use of the invention have polypeptide and/or carbohydrate structure.

A second aspect of the invention is a separation method as described herein, which is characterized in the use of the inventive device at the inlet of the reactor vessel used. The preferred variants are as described above. In case the conduits I are slidable and/or rotatable mounted in the inlet block, they are adjusted in regards to projecting height and/or flow directions in order to accomplish the surface flow with respect to the processing liquid as defined for the first aspect of the invention. The same objective will also be met in case the proper directions and positions for the conduits are selected from a number of variants in which the inlet devices has fixedly mounted conduits. It may be advantageous to optimise the flow directions from the conduits for each individual step of a process cycle comprising a retaining step as defined herein.

The best mode at the priority date is the variant described in FIGS. 3–4. Thus the inlet side (11) of the distribution chamber (1) has been circular, the cross-sectional area of the reaction vessel in form of a square, the distributor block as defined in WO 0025883 etc. Testing for appropriate conduits and flow velocities is done as outlined in the text to FIGS. 4a–e.

What is claimed is:

1. In an inlet device for a reactor vessel (5) for a separation method, which method includes retaining a substance on a separation medium from a liquid passing through the reactor vessel (5) which contains the separation medium, the improvement comprising including in said reactor vessel (a) a distributor block (7) for enabling a liquid flow to pass through the block into the reactor vessel (5),
    (b) an inlet block (3),
    (c) a distribution chamber (1) defined by a space between the distributor block (7) and the outlet side (11) of the inlet block (3),
    (d) at least one conduit (I; 13a,13b . . . ) passing through the inlet block (3) from the inlet side (10) to the outlet side (11) of said inlet block (3) and ending in the distribution chamber (1), said at least one conduit being able to distribute liquid into the distribution chamber (1),
    (e) a gross liquid flow direction going perpendicular to the plane of the interface between the distribution block (7) and the distribution chamber (1),
    and wherein one or more of said at least one conduits (13a,13b . . . ) in the chamber (1) are capable of moving selectively the liquid next to the inlet side surface (11) of the distribution chamber (1) along and/or against said surface (11).

2. The inlet device according to claim 1, wherein
    A. one or more conduits (Ia; 13'a,13'b . . . ) of said at least one conduit (I; 13a,13b . . . ) are capable of directing liquid radially in one or more distinct directions, all of which distinct directions are
        (i) within the interval of 180° around the central axis of the conduit (17),
        (ii) in the interval 90°–180°, relative to the liquid flow along the central axis (17) of the conduit, and
    B. said one or more conduits (Ia) are mounted in the outlet side (11) of the inlet block (3) in a manner to enable a circular liquid movement around the central axis (12) and along the inlet side (11) of the distribution chamber (1), and/or a liquid movement directed towards the same side (11).

3. The inlet device of claim 2, wherein said one or more conduits (Ia; 13'a,13'b . . . ) are distributed in an even manner annularly around the central axis (12) of the outlet side (11) of the inlet block (3).

4. The inlet device of claim 2, wherein said one or more conduits (Ib; 13"a,13"b . . . ) are distributed in an even manner annularly around the central axis (12) of the outlet side (1) of the inlet block (3), with the proviso that, if there is only one conduit (Ib; 13"a,13"b . . . ), it is placed in the center of the outlet side (11) of the inlet block (3).

5. The inlet device of claim 2, wherein said one or more conduits (Ib; 13"a,13"b . . . ) is/are located in the inner part and said one or more conduits Ia in the outer part of the outlet side (11) of the inlet side (3).

6. The inlet device of claim 2, wherein said conduits (Ia; 13'a,13'b . . . ) is/are capable of directing liquid in 1–10, such as 1–5, directions, and said conduits Ib, if present, is/are capable of directing liquid in 2–20, such as 2–15 directions.

7. The inlet device of claim 1, wherein one or more conduits (Ib; 13"a,13"b . . . ) of said at least one conduit (I; 13a,13b . . . ) direct liquid flow in two or more radial directions substantially opposite to each other.

8. The inlet device wherein the conduits (Ib;14"a,14"b . . . ) direct flow in a direction that is in the interval of 90°–180° against the flow in the conduit flow along the length axis (17) of the conduit (14"a).

9. The inlet device of claim 1, wherein the distribution chamber (1) is circular and coaxial with the central axis (12) of the reactor vessel (5), preferentially with a cross-sectional area not extending the cross-sectional area of the reactor vessel (5).

10. The inlet device of claim 1, wherein said one or more conduits of said at least one conduit (I; 13a,13b . . . ) are rotatable and/or slidable in the inlet block (3) and/or and have and opened or closed position.

11. The inlet device of claim 10, wherein the rotating, sliding and closing and/or opening of said at least one conduits (I; 13a,13b . . . ) is externally controllable.

* * * * *